INSENSITIVE THERMAL DISTORTION STRUCTURES

Filed Aug. 20, 1970

INVENTORS
ROBERT R. CARMAN
JAMES O. GIBSON
EARL ROTTMAYER
BY:
Oldham & Oldham
ATTORNEYS

3,713,959
INSENSITIVE THERMAL DISTORTION STRUCTURES

Earl Rottmayer and Robert R. Carman, Tallmadge, and James O. Gibson, Akron, Ohio, assignors to Goodyear Aerospace Corporation, Akron, Ohio Filed Aug. 20, 1970, Ser. No. 65,566
Int. Cl. B32b *3/12, 5/12, 19/02*
U.S. Cl. 161—59 8 Claims

ABSTRACT OF THE DISCLOSURE

A structural graphite composite material which has a very low, nearly zero, coefficient of thermal expansion. The material consists of graphite yarns laid up in an epoxy matrix.

Thermal deflections are the result of non-uniform heating of the exposed faces of a member. The uneven heating causes the exposed faces to expand at different rates. The problem is particularly acute in a space environment where one face is subjected to constant sunlight while the opposite face of the structural member is in darkness. In such a situation, the face which is exposed to sunlight is heated considerably more than is the opposed face. In large space structures, the thermal deflection may cause mass property changes of critical members. Thermal deflections also present problems in ground and space antenna structures where the exposure to sunlight or other non-uniform heating causes uneven expansions of the structural members making up the antenna with the resultant distortion of the antenna from its desired shape. The amount of thermal deflection is, of course, directly related to the coefficient of thermal expansion of the material. A material having a lower coefficient of thermal expansion will undergo a lesser deflection than will a material with a higher coefficient due to changes in thermal environments. Graphite has a very low, nearly zero, coefficient of thermal expansion and therefore undergoes little thermal deflection. Also, graphite offers excellent structural properties such as high strength and high modulus of elasticity which would make it suitable for use as a structural material.

It is the primary object of this invention to provide a graphite composite material which has an extremely low coefficient of thermal expansion and is thus relatively insensitive to thermal deflection while possessing desirable structural properties of low density, high strength, and high modulus of elasticity.

It is also an object of the invention to provide a graphite composite material which is insensitive to thermal deflections and which may be efficiently fabricated into structural forms such as tubing, sheets, sandwich composites, etc.

Another object of the invention is the provision of a graphite composite material which may be used to fabricate structures intended for use in a space environment in which the effects of thermal reflections are minimized.

In the present invention, the above objectives are achieved by providing a graphite composite material in the form of graphite yarns laid up in an epoxy matrix. The material may be formed or molded into structural configurations and then cured. The resultant material has an extremely low coefficient of thermal expansion and is thus insensitive to thermal deflections.

The above and other objects and advantages of the invention become apparent upon consideration of the following specification and the accompanying drawings wherein there is shown a preferred embodiment of the invention.

It should be understood that the unique or critical idea of the invention is to provide the combination of carbon fibers such as those made by Union Carbide as defined above which have a negative coefficient of expansion with a resin system of any desired characteristics which resin system has a positive coefficient of expansion where such combination or coordination between these products is achieved so that a resultant product having a zero coefficient of expansion is achieved, or one as nearly close to zero as possible.

It is a known physical fact that all graphite fibers or yarns that are typically known to the art will have a negative coefficient of expansion characterized by excellent strength and a modulus of elasticity properties. The epoxy, plastic, or other typically suitable matrix may be of the prepreg or formed in place type and in effect provides a combination of the yarns with the resin or matrix base to form a composite structure. The resin or whatever other material is utilized to make the matrix also must have particular characteristics of strength in tensile and shear to meet the desired objects for the structural characteristics of the material in its ultimate use.

As a typical example, we would utilize a carbon or graphite yarn having a modulus of elasticity of $75\times10^6$ lbs. per square inch with a coefficient of expansion of $-0.7\times10^{-6°}$ F., and combine this with a resin system having a modulus of elasticity of $.8\times10^6$ lbs. per square inch, and a coefficient of expansion of $20\times10^{-6°}$ F. A typical resin to meet these configurations would be one commonly known as ERLA 4617, as made and sold by the Union Corporation, which is a copolymer of ethylene glycol and bis(2,3-epoxy cyclopentyl) ether. We have found with these two characterizing materials that between 25% to 35% weight of resin with three or more plies of unidirectional material at equal angular spacing will achieve a substantially zero coefficient of expansion characteristics in the resultant matrix, as the desirable characterizing feature of the invention.

Figures 1, 2:
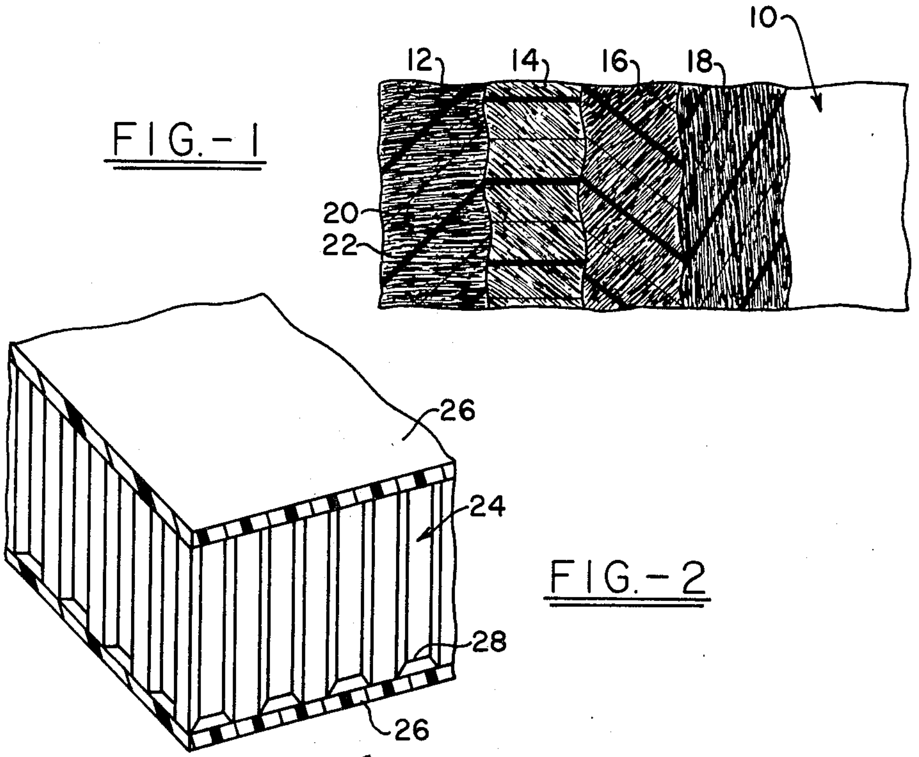
FIG. 1 is a plan view of a small piece of a sheet of composite graphite material, on a greatly enlarged scale with portions of the material broken away to show the interior structures thereof.
FIG. 2 is a perspective view of a honeycomb panel the facings of which consists of the composite graphite material of the present invention.

As shown in FIG. 1, a sheet of the graphite composite material may be formed by laminating a number of layers 12–18, each of which consists of graphite yarns 20 embedded in a resin impregnated epoxy matrix 22. The successive layers 14–18 are laid up with the yarns running at different angles within the plane of the sheet 10 so that a cris-crossing of the yarn is achieved. Preferably, the invention contemplates that at least three layers of threads or yarns will be utilized with these angles between the layers preferably being equal. These angles can vary from the largest at 60° intervals to as small as perhaps 15° intervals.

It should be understood that while the layers 12–18 are shown as being separate distinct layers, this is for illustrative purposes only. After the sheet 10 has been molded and cured, the layers 12–18 form a single sheet and the separation or division between successive layers is totally eliminated. It should also be understood that the graphite composite material may be formed into shapes other than flat sheets and that the number of layers shown in the drawings is illustrative only.

This material is ideally suited for use in structures which must be insensitive to thermal distortion. The coefficient of thermal expansion of the graphite composite material forming the plates 10 is less than $3\times10^{-7}$ in./in./° F.

The sheets of graphite composite material 10 may be employed in honeycomb sandwich panels as shown in FIG. 2. Sheets 26 of the laminated graphite material may be bonded to the open faces of a conventional honeycomb 24 by an adhesive layer 28. Such a panel is ideally suited for use in structures where a high degree of dimensional stability must be maintained over a wide range of temperature since the honeycomb core imparts considerable strength to the panel while maintaining a low density and the facings 26 assure that the thermal deflection of the panel will be minimized.

Other core arrangements may be used, for example, a graphite core may be surrounded with the sheets 10. Also, the sheets may be used in solid form. The particular core or the lack of core will be determined by application to which the graphite composite material is applied. The requirements of strength and elasticity determine the necessary structure.

Figure 3:
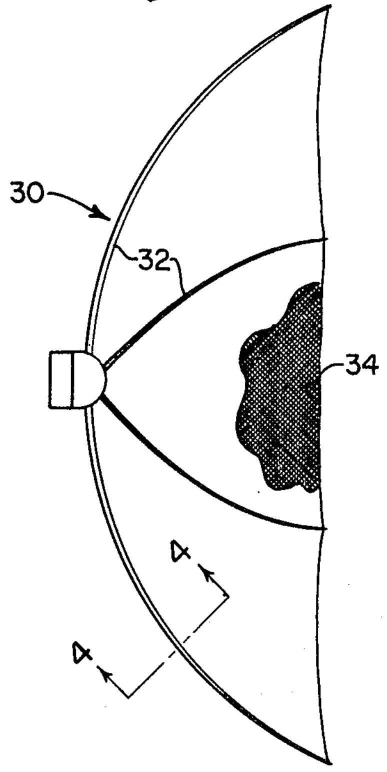
FIG. 3 is a side elevational view of a parabolic antenna constructed of components fabricated of the graphite composite materials.
Figure 4:
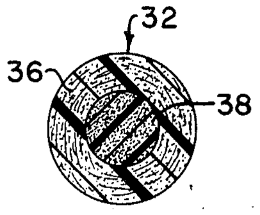
FIG. 4 is a sectional view taken along the line 4—4 of FIG. 3.

FIGS. 3 and 4 illustrate the use of structural members formed of the graphite composite material of the present invention. In these figures the numeral 30 designates a parabolic antenna which is formed of ribs 32 and a wire mesh 34 forming the reflective surface of the antenna. Conventionally, the ribs 32 and mesh 34 are formed of steel and when the antenna is subjected to direct sunlight, uneven heating of the ribs and the mesh occurs, causing thermal deformation of the antenna to distort it from its true parabolic shape. By the use of the graphite composite materials of the present invention, this undesirable distortion is eliminated. The ribs 32 are fabricated of the graphite material 36 formed around a core 38. Since the coefficient of thermal expansion of the material is extremely low, the thermal distortion of the antenna structure is reduced to an inconsequential amount.

Hence, it is seen that to eliminate or substantially reduce the deflection of structures resulting from the thermal expansion of the various structural members due to changing thermal environments, the judicious application of graphite composite materials can achieve this effect. The material has a very low, nearly zero, coefficient of expansion, and this feature combined with the other good structural properties such as low density, high strength and modulus of elasticity, and its ability to be fabricated into efficient structural form such as tubing, sheet, sandwich composites, fittings, etc. by the graphite yarn epoxy matrix relationship defined above provides a unique solution to the problem.

Potential applications are any structures where thermal deflections are detrimental to the performance of the device. Particular applications therefore include ground and space antennae, large space structures where thermal deflections may cause mass property changes on critical member loads, solar concentrators, optical devices, and the like. We have found that the application of this principle to a large aperture antenna instead of conventional metal materials essentially eliminates thermal deflections and permits growth in microwave operating frequency from 10 gHz. to microwave frequencies in excess of 60 gHz. or an effective growth in diameter from 30 feet to an excess of 80 feet.

It should be understood that the invention is not limited to the embodiments described and that further modifications may be made. Reference should therefore be had to the appended claims in determining the true scope of the invention.

What is claimed is:

1. A laminate material characterized by its insensitivity to thermal distortion, comprising:

a composite structure of carbon fibers in a resin system, the carbon fibers having a negative coefficient of expansion, and the resin system having a positive coefficient of expansion approximately equal in magnitude to that of the carbon fibers.

2. The laminate material according to claim 1 wherein the carbon fibers have a modulus of elasticity of approximately $75\times10^6$ lbs. per square inch and a coefficient of expansion of approximately $-0.7\times10^{-6}$° F., and the resin system has a modulus of elasticity of approximately $0.8\times10^6$ lbs. per square inch and a coefficient of expansion of approximately $20\times10^{-6}$° F.

3. The laminate material according to claim 2 wherein the resin system comprises between 25% and 35%, by weight, of the composite structure.

4. The laminate material according to claim 2 wherein the resin system consists of a copolymer of ethylene glycol and bis (2,3-epoxy cycopentyl) ether.

5. A laminate material characterized by its insensitivity to thermal distortion, comprising:

a plurality of layers of carbon fibers, the fibers having a small negative coefficient of expansion; and a resin system surrounding the carbon fibers, the resin system having a small positive coefficient of expansion.

6. The laminate material according to claim 5 wherein the carbon fibers within each layer run substantially parallel to one another, and the carbon fibers of each layer run at an angle to the fibers of the other layers.

7. The laminate material according to claim 6 wherein the material has at least three layers of carbon fibers, the angle between the fibers of adjacent layers is substantially equal and within a range of approximately 60° to approximately 15°.

8. A high strength, low density panel characterized by its insensitivity to thermal distortion, comprising:

a honeycomb core the wall portions of which extend normal to the principal surfaces of the panel;

at least one sheet composed of carbon fibers and a resin system, the sheet forming at least one principal surface of the panel and bonded to the honeycomb core, the carbon fibers having a small negative coefficient of expansion and the resin system having a small positive coefficient of expansion.

References Cited

UNITED STATES PATENTS

| | | | |
|---|---|---|---|
| 3,490,983 | 1/1970 | Lee | 161—59 |
| 2,901,455 | 8/1959 | Jurras | 161—59 X |
| 3,466,219 | 9/1969 | Schwartz | 161—59 X |
| 3,462,340 | 8/1969 | Hough | 161—59 |
| 2,301,742 | 1/1967 | Noland et al. | 161—170 |
| 3,573,086 | 3/1971 | Lambdin, Jr. | 117—46 |

PHILIP DIER, Primary Examiner

U.S. Cl. X.R.

23—209.2; 117—127, 132; 161—68, 170, 186